United States Patent [19]

Wieder et al.

[11] 4,288,581
[45] Sep. 8, 1981

[54] ALTERNATING ISOPRENE-ETHYLENE COPOLYMERS AND A PROCESS FOR THE PREPARATION THEREOF

[75] Inventors: Wolfgang Wieder, Leverkusen; Josef Witte, Cologne, both of Fed. Rep. of Germany

[73] Assignee: Bayer Aktiengesellschaft, Fed. Rep. of Germany

[21] Appl. No.: 199,071

[22] Filed: Oct. 20, 1980

[30] Foreign Application Priority Data

Oct. 25, 1979 [DE] Fed. Rep. of Germany ....... 2943129

[51] Int. Cl.³ .................. C08F 4/76; C08F 236/08
[52] U.S. Cl. .................. 526/169.2; 260/336 A; 526/339
[58] Field of Search .................. 526/339, 169.2

[56] References Cited

U.S. PATENT DOCUMENTS 3,803,106  4/1974  Hayashi et al. ............ 526/339

Primary Examiner—Stanford M. Levin
Attorney, Agent, or Firm—Connolly and Hutz

[57] ABSTRACT

The invention refers to Isoprene-ethylene copolymers having alternating monomer units in which the proportion of recurring -isoprene-ethylenesequences is more than 80 mol %, in which the proportion of built-in isoprene in the 1,4-configuration is more than 80 mol % which consists of more than 70 mol % of a trans-arrangement, and in which less than 5 mol % of the built-in isoprene is present in the 3,4-configuration, the copolymers having a glass temperature of between $-70°$ C. and $-90°$ C., a Mooney-viscosity of between 30 and 150 [ML 1+4 (100° C.)] and a viscosity number $[\eta]$, measured at 25° C. in toluene, of between 0.5 and 6, and a process for their preparation characterized in that polymerization is carried out in solution at a temperature of between $-80°$ C. and $+100°$ C. in the presence of a catalyst system which consists of (a) a vanadium compound of the formula $VO(OR)_2X$ and
(b) an organoaluminium compound of formula $AlR'_3$, $HAlR'_2$ or $R'_2AlY$
wherein
R represents an alkyl group containing from 1–20 carbon atoms,
X represents a halogen atom,
R' represents an alkyl group containing from 1 to 8 carbon atoms
Y represents a halogen atom;
whereby the molar ratio of b:a is between 100:1 and 1:10.

10 Claims, No Drawings

ALTERNATING ISOPRENE-ETHYLENE COPOLYMERS AND A PROCESS FOR THE PREPARATION THEREOF

The invention relates to alternating isoprene-ethylene copolymers having a certain configuration and molecular weight and also a process for the preparation thereof by solution polymerization in the presence of an organometallic mixed catalyst containing vanadium.

Alternating isoprene-ethylene copolymers are described in German Offenlegungsschrifts Nos. 2,113,164 and 2,128,804. However, the preparation process described results in poor yields of the product and, moreover, the isoprene units of the product are not arranged stereospecifically. In the stated Examples, the copolymerization is accompanied by a product rich in ethylene, from which the desired isoprene-ethylene copolymers have to be separated by extraction techniques.

The processes described in the mentioned German Offenlegungsschrifts produce products having a microstructure which is largely independent of the polymerization conditions. Products are produced whose isoprene units are built-in to approximately 60% in the 1,4-configuration and to approximately 40% in the 3,4-configuration. The cis-1,4-content is constantly higher than the trans-1,4-content, for example in a ratio of approximately 4:1. The glass temperatures of such copolymers are stated as being approximately −55° C.

The alternating isoprene copolymers prepared according to the process of the present invention have a different micro structure and constitute a product class which was previously unknown. The copolymers according to the present invention are characterized by a high alternating level, i.e. more than 80 mol %, preferably more than 90 mol % of the built-in monomer units are present in the recurring sequence:

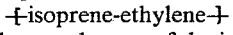

The copolymers of the invention are also characterized in that of the built-in isoprene units, more than 80 mol % and preferably more than 90 mol % are present in the 1,4-configuration, and wherein this consists of more than 70 mol % and preferably more than 80 mol % of trans-arrangements.

Less than 5 mol % of the built-in isoprene is present in the 3,4-configuration. The predominant microstructure of the copolymers according to the invention thus consists of units which may be represented by the formula:

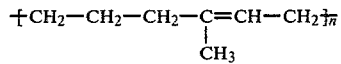

The glass temperature of the copolymers of the invention is between −70° C. and −90° C. and preferably −80° C.±5° C., determined by DSC-measurements (differential scan calorimetry). The Mooney-viscosities of the copolymers of the invention are between 30 and 150, preferably between 40 and 120, most preferably between 50 and 80 [ML 1+4 (100° C.)]. The viscosity figures [η], measured at 25° C. in toluene, are between 0.5 and 6, preferably between 1.0 and 3.5.

The copolymers according to the invention may be prepared by carrying out copolymerization in the presence of a catalyst which consists of (a) a vanadium compound of the formula: VO (OR)$_2$ X and (b) an organoaluminium compound of the formula: HAlR'$_2$, Al R'$_3$ or R'$_2$AlY.

The molar ratio b:a is between 100:1 and 1:10, preferably between 10:1 and 1:1.

The substituent R in the above formula represents a straight chain, branched or cycloalkyl group containing from 1 to 20 carbon atoms, preferably containing from 1 to 8, most preferably containing from 4 to 8 carbon atoms. At least one of the alkyl groups is preferably branched. It is particularly preferred for both alkyl groups to be branched. The substituent X represents a halogen atom (chlorine, bromine).

The substituent R' represents a straight-chain, branched or cycloalkyl group containing from 1 to 8 carbon atoms.

Y represents a halogen atom (chlorine, bromine, iodine).

The following are mentioned by way of example as vanadium compounds (a):
Dimethoxyvanadiumoxychloride;
Diethoxyvanadiumoxychloride;
Dipropoxyvanadiumoxychloride;
Di-isopropoxyvanadiumoxychloride;
Dibutoxyvanadiumoxychloride;
Diisobutoxyvanadiumoxychloride;
Di-sec.-butoxyvanadiumoxychloride;
Di-tert.-butoxyvanadiumoxychloride;
Dipentyloxyvanadiumoxychloride;
Di-isoamyloxyvanadiumoxychloride;
Di-neopentyloxyvanadiumoxychloride;
Di-hexyloxyvanadiumoxychloride;
Di-(2-ethylhexyloxy)vanadiumoxychloride;
2-Ethylhexyloxyneopentyloxyvanadiumoxychloride;
n-Butyloxyneopentyloxyvanadiumoxychloride;
2-Ethylbutoxy-neopentyloxyvanadiumoxychloride;
2-Methylbutoxyneopentyloxyvanadiumoxychloride; and
Isobutoxyneopentyloxyvanadiumoxychloride.

The following are particularly preferred: Di-neopentyloxyvanadiumoxy-chloride, di-(2-ethylhexyloxy)-vanadiumoxychloride, 2-ethyl-hexyloxyneopentyloxy vanadiumoxychloride, 2-ethylbutoxy-neopentyloxyvanadiumoxychloride, 2-methylbutoxyneopentyloxyvanadiumoxychloride and n-butyloxyneopentyloxyvanadiumoxychloride.

The following are mentioned by way of example as aluminum compounds (b):
Trimethylaluminum;
Triethylaluminum;
Tripropylaluminum;
Tributylaluminum;
Triisobutylaluminum;
Tri-cyclohexylaluminum;
Trioctylaluminum;
Diisobutylaluminumhydride;
Diethylaluminumchloride;
Diethylaluminumbromide; and
Diethylaluminumiodide.

Triisobutylaluminum is particularly preferred.

The catalyst component (a) is preferably used in quantities of from 0.01 to 15 mmol, based on 100 g of ethylene, and with particular preference in quantities of from 0.1 to 10 mmol.

The process according to the invention is also characterized in that polymerization takes place in solution. Aromatic, cyclo-aliphatic and aliphatic compounds are suitable as the solvent, e.g., benzene, toluene, pentane, hexane, heptane, cyclohexane and chlorohydrocarbons such as dichloromethane. However, polymerization may also be carried out in excess isoprene as the solvent. The reaction is carried out at temperatures of between −80° C. and +100° C., optionally under pressure, temperatures of between −60° C. and +60° C. being preferred. A preferred embodiment of the invention consists in introducing isoprene and the catalyst, optionally in a solvent, and introducing ethylene up to the required final transformation. However, it is also possible in the sense of a conventional solution polymerization, to introduce the monomers in solvent and subsequently to add the catalyst.

Isoprene is used in excess, i.e. the molar ratio of isoprene to ethylene is constantly greater than 1:1, preferably between 1.1–100:1.

After polymerization has ceased, the catalyst is deactivated in a conventional manner by adding amines, alcohols or carboxylic acids such as triethylene amine, ethanol or formic acid. After adding a stabiliser, e.g. 2,6-di-tert. butyl methyl phenol, the product according to the invention may be isolated by precipitation or stripping. The entire process, polymerization and working up, may be carried out discontinuously or continuously.

A particular advantage of the process according to the invention consists in the fact that no remarkable quantities, for example not more than 5%, of insoluble polymers are produced, as is the case according to the processes of German Offenlegungsschrifts Nos. 2,113,164 and 2,128,804.

The copolymers according to the invention are suitable for use as synthetic rubbers. They may be processed and vulcanized in the traditional manner. The products may be used for the production of car tyres and industrial rubber articles.

EXAMPLE 1

250 ml of isoprene, 10 mmol of i-Bu$_3$Al and 1 mmol of dineopentyloxyvanadiumoxychloride were introduced into a dry flask under a nitrogen atmosphere. 10 g of ethylene were then introduced at 0° C. during a period of 30 minutes whereby the solution became more viscous. After the ethylene had been added, the solution was further stirred at 0° C. for another 10 minutes, and the resulting product was precipitated in alcohol, which contained some 2,6-di-tert.butyl methyl phenol as the stabilizer, and then dried at 50° C. under vacuum. 27 g (78%, based on ethylene) of a rubber-like product was obtained. Viscosity number, $[\eta]$, measured in toluene at 25° C. was 1.25 dl/g. The product had the following micro structure: determined NMR-spectroscopically); 47.9 mole % of 1,4-isoprene, 2.0 mol % of 3,4-isoprene, 50.1 mole % of ethylene. Trans/cis of 1,4-isoprene 83.2/16.8.

EXAMPLE 2

This example was performed as described in Example 1, except that a temperature of −20° C. was used instead of 0° C. Yield: 25 g (73%, based on ethylene). $\eta = 1.67$ dl/g, micro structure: 47.8 mol % of 1,4-isoprene, 1.0 mol % of 3,4-isoprene, 51.2 mole % of ethylene, trans/cis of 1,4-isoprene 85.0/15.0.

EXAMPLE 3

This example was performed as in Example 1, but at −40° C. Yield: 31 g (90%, based on ethylene). $\eta = 2.48$ dl/g, micro structure: 47.6 mole % of 1,4-isoprene, 1.1 mol % of 3,4-isoprene, 51.3 mol % of ethylene. Trans/cis of 1,4-isoprene 86.0/14.0. The product revealed the following values in a DSC-analysis: glass transition: −82° C. A peroxidically cross-linked sample revealed a crystallization at eight-fold expansion.

EXAMPLE 4

This example was performed as in Example 3, except that 5 mmol of i-Bu$_3$Al and 0.5 mmol of dineopentyloxyvanadiumoxychloride were used. Yield: 25 g (73%, based on ethylene). $\eta = 2.21$ dl/g.

EXAMPLE 5

250 ml of hexane, 250 ml of isoprene, 10 mmol of i-Bu$_3$Al and 1 mmol of di-neopentyloxyvanadiumoxychloride were introduced into a dry flask under a nitrogen atmosphere. 20 g of ethylene were introduced at −40° C. in 60 minutes. The method was continued as described in Example 1. Yield: 68 g (99%, based on ethylene). ML 1+4 (100° C.): 51.

EXAMPLE 6

The example was performed as described in Example 5, except that 500 ml of hexane were used. 40 g of ethylene were introduced in 120 minutes. Yield: 86 g (63%, based on ethylene). $\eta = 2.03$ dl/g. ML 1+4: 65.

We claim:

1. Isoprene-ethylene copolymers having alternating monomer units in which the proportion of recurring
   —isoprene-ethylene—
sequences is more than 80 mol %, in which the proportion of built-in isoprene in the 1,4-configuration is more than 80 mol % which consists of more than 70 mol % of a trans-arrangement, and in which less than 5 mol % of the built-in isoprene is present in the 3,4-configuration, the copolymers having a glass temperature of between −70° C. and −90° C., a Mooney-viscosity of between 30 and 150 [ML 1+4 (100° C.)] and a viscosity number $[\eta]$, measured at 25° C. in toluene, of between 0.5 and 6.

2. Isoprene-ethylene copolymers according to claim 1, wherein the proportion of recurring
   —isoprene-ethylene—
sequences is more than 90 mol %, and wherein the proportion of built-in isoprene in the 1,4-configuration is more than 90 mol % which consists of more than 80 mol % of a trans-arrangement.

3. Isoprene-ethylene copolymers according to claim 1 or 2, having a glass temperature of between −75° C. and −85° C., a Mooney-viscosity of between 40 and 120 [ML 1+4 (100° C.)] and a viscosity number $[\eta]$, measured at 25° C. in toluene, of between 1.0 and 3.5.

4. A process for the preparation of isoprene ethylene copolymers according to any of claims 1 to 3, characterized in that polymerization is carried out in solution at a temperature of between −80° C. and +100° C. in the presence of a catalyst system which consists of
   (a) a vanadium compound of the formula VO(OR)$_2$X and
   (b) an organoaluminum compound of formula Al R'$_3$, HAlR'$_2$ or R'$_2$AlY
   wherein
   R represents an alkyl group containing from 1–20 carbon atoms,
   X represents a halogen atom,
   R' represents an alkyl group containing from 1 to 8 carbon atoms,
   Y represents a halogen atom.

whereby the molar ratio of b:a is between 100:1 and 1:10.

5. A process according to claim 4, characterized in that a catalyst system is used, consisting of di-neopentyloxyvanadiumoxychloride, di-(2-ethylhexyloxy)-vanadiumoxychloride, 2-ethylhexyloxyneopentyloxyvanadiumchloride, n-butyloxyneopentyloxyvanadiumoxychloride, 2-ethylbutoxyneopentyloxyvanadiumoxychloride, 2-methylbutoxyneopentyloxyvanadiumoxychloride and/or isobutoxyneopentyloxyvanadiumoxychloride and triisobutylaluminum.

6. A process according to claim 4 or 5, characterized in that polymerization is carried out at a temperature of from $-60°$ C to $+60°$ C.

7. A process according to any of claims 4 to 6, characterized in that the molar ratio of b:a in the catalyst system is between 10:1 and 1:1.

8. A process according to any of claims 4 to 7, characterized in that isoprene and ethylene are polymerized in a molar ratio greater than 1:1.

9. A process according to any of claims 4 to 8, characterized in that isoprene and ethylene are polymerized in the molar ratio of 1.1–100:1.

10. A process according to claims 4 to 9, characterized in that isoprene and the catalyst are introduced initially and ethylene is subsequently introduced.

* * * * *